(12) United States Patent
Togawa et al.

(10) Patent No.: US 11,016,570 B2
(45) Date of Patent: May 25, 2021

(54) INPUT DEVICE

(71) Applicant: PANASONIC INTELLECTUAL PROPERTY MANAGEMENT CO., LTD., Osaka (JP)

(72) Inventors: Hiroyuki Togawa, Osaka (JP); Sho Sonoda, Osaka (JP); Kai Masamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/561,897

(22) Filed: Sep. 5, 2019

(65) Prior Publication Data

US 2019/0391656 A1 Dec. 26, 2019

Related U.S. Application Data

(63) Continuation of application No. PCT/JP2018/037228, filed on Oct. 4, 2018.

(30) Foreign Application Priority Data

Dec. 18, 2017 (JP) .............................. JP2017-241837

(51) Int. Cl.
*G06F 3/01* (2006.01)
*G06F 3/042* (2006.01)
(Continued)

(52) U.S. Cl.
CPC .............. *G06F 3/016* (2013.01); *G06F 3/042* (2013.01); *G06F 3/044* (2013.01); *G06F 3/045* (2013.01); *G06F 2203/04105* (2013.01)

(58) Field of Classification Search
CPC .......... G06F 3/016; G06F 3/042; G06F 3/044; G06F 3/045

See application file for complete search history.

(56) References Cited

U.S. PATENT DOCUMENTS

2006/0109256 A1 5/2006 Grant et al.
2010/0079404 A1* 4/2010 Degner .................. G06F 3/044
345/174
(Continued)

FOREIGN PATENT DOCUMENTS

JP 2001-228967 8/2001
JP 2008-516348 5/2008
(Continued)

OTHER PUBLICATIONS

Official Communication issued in International Patent Application No. PCT/JP2018/037228, dated Nov. 6, 2018, along with English translation.

*Primary Examiner* — Amare Mengistu
*Assistant Examiner* — Cory A Almeida
(74) *Attorney, Agent, or Firm* — Greenblum & Bernstein, P.L.C.

(57) ABSTRACT

An input device includes a movable section having a touch sensor, and an actuator that is mechanically fixed to the touch sensor and vibrates in a lateral direction; a support that supports the movable section via an elastic component; and a pressure sensor that (i) is disposed on a side opposite to a side on which the support supports the movable section and (ii) detects a pressing operation to the touch sensor. At least one of the movable section and the support transmits a force from the pressing operation to the pressure sensor due to the movable section and the support moving integrally and as a whole in a direction of the pressing operation when the pressing operation is performed.

16 Claims, 8 Drawing Sheets

(51) Int. Cl.
*G06F 3/044* (2006.01)
*G06F 3/045* (2006.01)

(56) References Cited

U.S. PATENT DOCUMENTS

| | | | |
|---|---|---|---|
| 2011/0141052 A1* | 6/2011 | Bernstein | G06F 3/0416 345/174 |
| 2015/0198977 A1* | 7/2015 | Takizawa | G06F 3/041 345/173 |
| 2015/0293640 A1 | 10/2015 | Takeuchi et al. | |
| 2016/0011712 A1* | 1/2016 | Yamamoto | G01C 21/36 345/173 |
| 2017/0083098 A1 | 3/2017 | Usui | |

FOREIGN PATENT DOCUMENTS

| | | |
|---|---|---|
| JP | 2012-108949 | 6/2012 |
| JP | 3177835 | 8/2012 |
| JP | 2013-513865 | 4/2013 |
| JP | 2015-201062 | 11/2015 |
| JP | 2017-207369 | 11/2017 |
| WO | 2006/042309 | 4/2006 |
| WO | 2011/071837 | 6/2011 |
| WO | 2015/186771 | 12/2015 |

\* cited by examiner

– 1 –
INPUT DEVICE

CROSS REFERENCE TO RELATED APPLICATIONS

This is a continuation application of PCT International Application No. PCT/JP2018/037228 filed on Oct. 4, 2018, designating the United States of America, which is based on and claims priority of Japanese Patent Application No. 2017-241837 filed on Dec. 18, 2017.

BACKGROUND

1. Technical Field

The present disclosure relates to an input device.

2. Description of the Related Art

An input device is known as a conventional technique.

The input device in Japanese Unexamined Patent Application Publication (Translation of PCT Application) No. 2013-513865 includes a touchpad component having a touchpad sensor array that collects a touch sensor array signal that represents a predetermined location where an external object has touched the touchpad component; four force sensor that are connected to the touchpad component in different locations and that generate a force output signal that represents a strength of the force by which the external object pushes down the touchpad component; and an actuator that laterally moves the touchpad component. The touchpad component has a flat, rectangular structure. The force sensors are each disposed beneath the four corners of the touchpad component. The actuator is coupled to the touchpad component by an arm extending laterally.

SUMMARY

However, the input device according to the above Japanese Unexamined Patent Application Publication (Translation of PCT Application) No. 2013-513865 can be improved upon.

In view of this, the present disclosure provides an input device capable of improving upon the above related art.

The present disclosure discloses an input device that includes a movable section having a touch sensor, and an actuator that is mechanically fixed to the touch sensor and vibrates in a lateral direction; a support that supports the movable section via an elastic component; and a pressure sensor that (i) is disposed on a side opposite to a side on which the support supports the movable section and (ii) detects a pressing operation to the touch sensor. The elastic component includes two flat springs each disposed across a corresponding one of two portions in the movable section that face each other in a vibration direction of the actuator and a corresponding one of two portions in the support that face each other in the vibration direction of the actuator. At least one of the movable section and the support transmits a force from the pressing operation to the pressure sensor due to the movable section and the support moving integrally and as a whole in a direction of the pressing operation when the pressing operation is performed.

The present disclosure makes it possible to both reduce the number of pressure sensors to one and equalize operation sensitivity during the pressing operation.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Underling Knowledge Forming Basis of Present Disclosure

The inventors have identified the following problem related to an input device described in the column "Description of the Related Art."

The input device in Japanese Unexamined Patent Application Publication (Translation of PCT Application) No. 2013-513865 includes four force sensors, but the inventors face the problem of wanting to reduce this number. The input device in Japanese Unexamined Patent Application Publication (Translation of PCT Application) No. 2013-513865 faces the problem that, since an actuator is coupled to a touchpad component by an arm extending laterally, a pressure amount changes depending on where a user presses down a surface of the touchpad component, and tactile feedback (operating sensitivity during a pressing operation) from the actuator to the touchpad component varies.

The problem of the present disclosure lies in both reducing the number of pressure sensors and equalizing the operation. sensitivity during the pressing operation.

Hereinafter, embodiments will be described with reference to the drawings.

Embodiment 1

Figure 1:
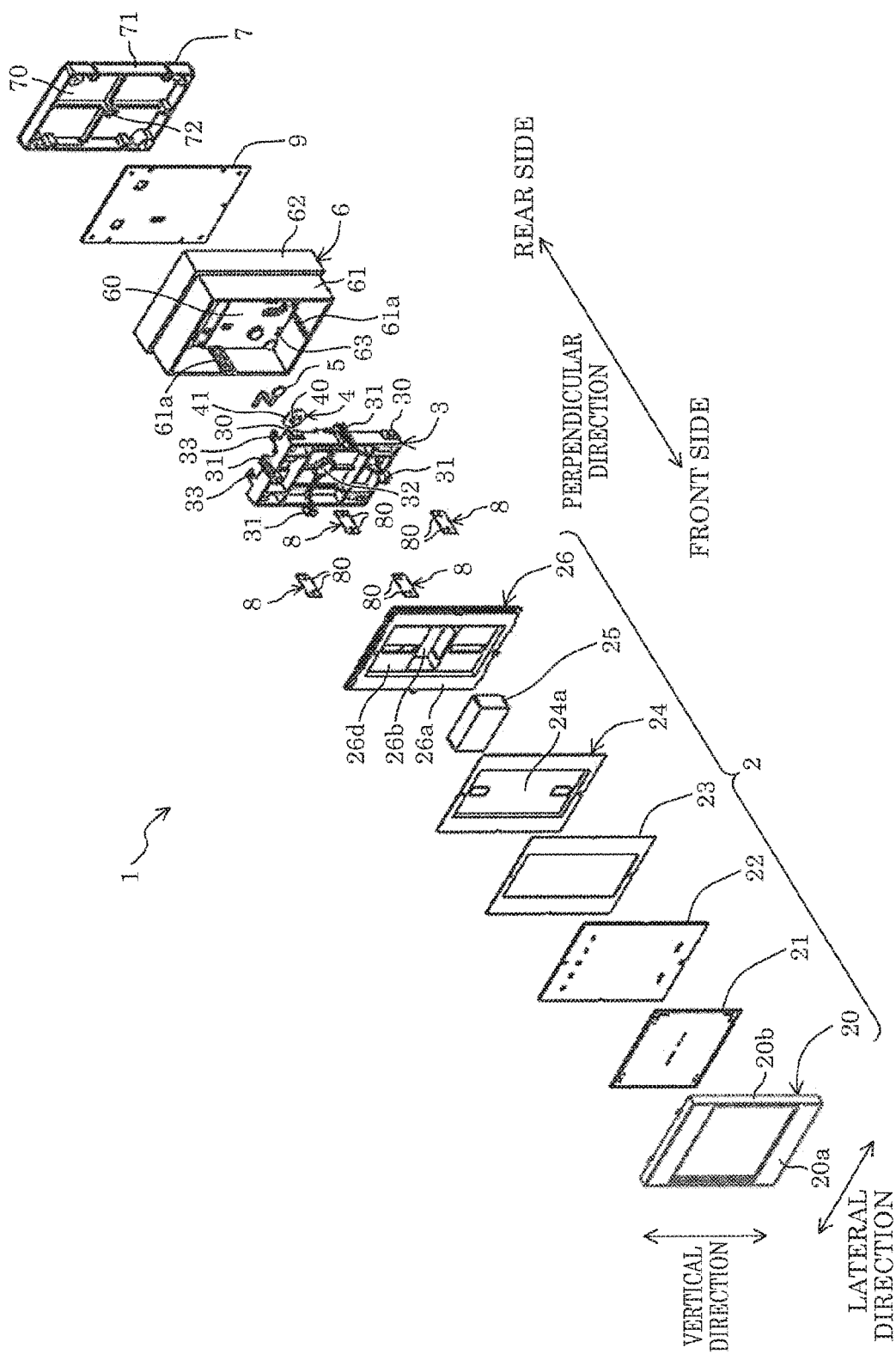
FIG. 1 is an exploded perspective view of an input device according to Embodiment 1.
Figure 2:
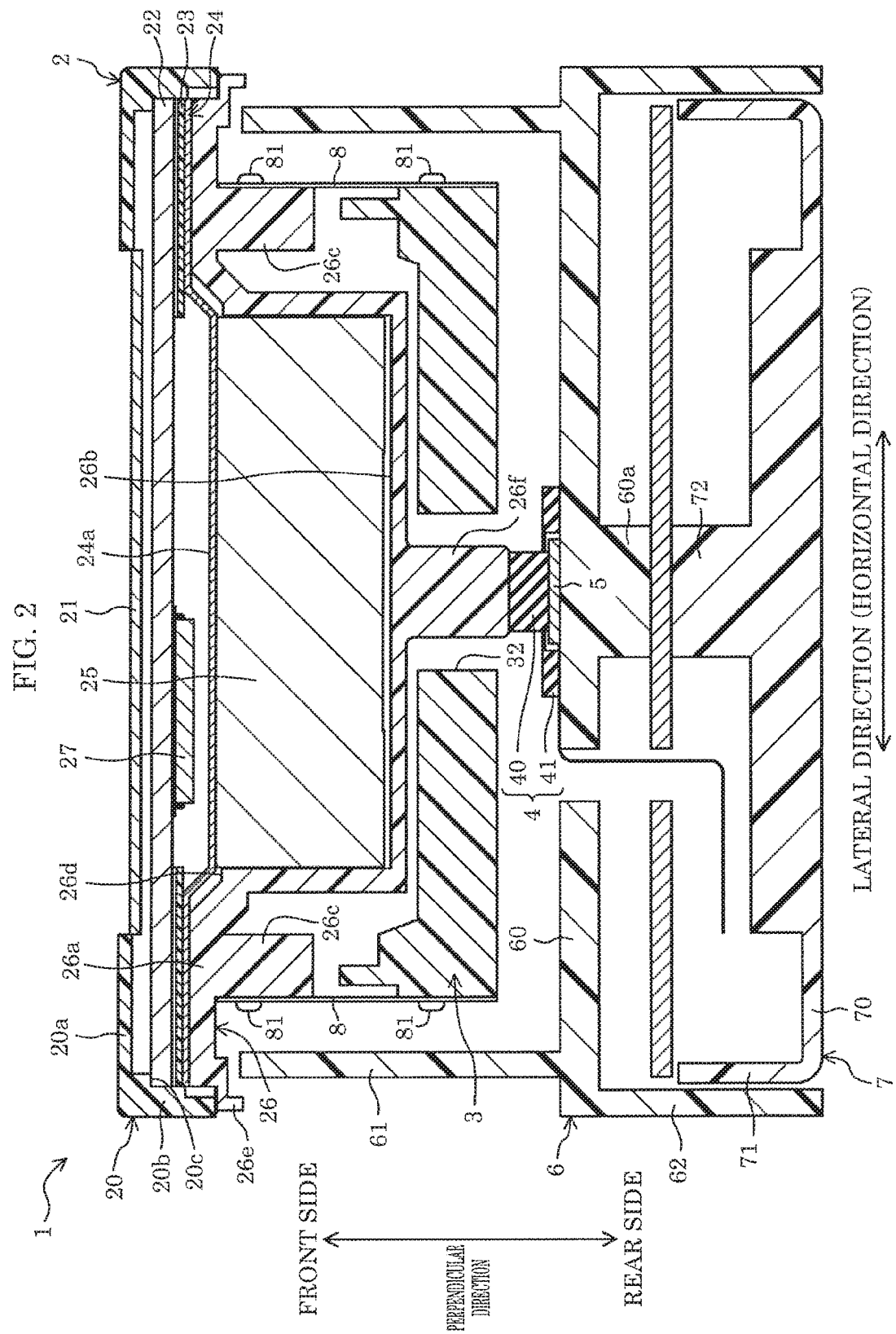
FIG. 2 is a cross-sectional view of the input device.
Figure 3:
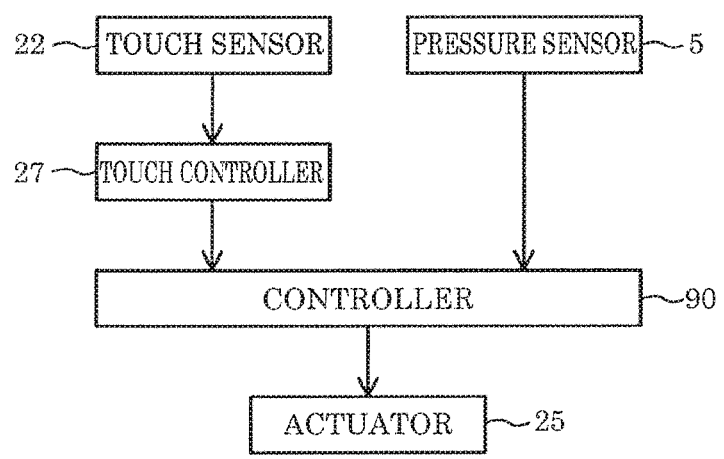
FIG. 3 is a block diagram showing a controller of the input device.

FIG. 1 is an exploded perspective view of an input device. FIG. 2 is a cross-sectional view of the input device during normal operation. FIG. 3 is a block diagram showing a controller of the input device. The input device is, for example, included in a vehicle and is used for operating in-vehicle devices. As illustrated in FIGS. 1 to 3, input device 1 includes movable section 2, support 3, damper 4, pressure sensor 5, main body 6, and back cover 7. Movable section 2, support 3, damper 4, pressure sensor 5, man. body 6, and back cover 7 are disposed in this order.

Note that in the present embodiment, a direction along which movable section 2, support 3, damper 4, pressure sensor 5, main body 6, and back cover 7 are disposed is called the perpendicular direction for convenience sake, and movable section 2 is on the front side and back cover 7 on the rear side of this perpendicular direction. In the present embodiment, a direction orthogonal to the perpendicular direction is called the horizontal direction, and in this horizontal direction, an up-down direction is called the vertical direction and a direction orthogonal to this vertical direction is called the lateral direction for convenience sake.

Movable section 2 includes decorative component 20, operation panel 21, touch sensor 22, spacer 23, conductive plate 24, actuator 25, and support 26. Decorative component 20 is a resin component that decorates a front side of input device 1. Decorative component 20 includes frame 20a that is substantially rectangular and board-shaped, and peripheral wall 20b that extends from outer edges of frame 20a toward the rear side and is substantially rectangular when seen along the perpendicular direction. An inner periphery of edges of the rear side of peripheral wall 20b includes step 20c.

Operation panel 21 is for operating the in-vehicle devices. Operation. panel 21 is substantially rectangular and plate-shaped. Operation panel 21 is disposed on a rear surface of outer edges of an opening of frame 20a in decorative component 20. Operation panel 21 is disposed to form a gap between operation panel 21 and touch sensor 22 during normal operation.

Touch sensor 22 is a capacitive touch sensor that detects a position and a contact area of a hand or finger of a user that contacts touch sensor 22 via operation panel 21. Operation panel 22 is substantially rectangular and plate-shaped. A central portion on the rear surface of touch sensor 22 includes touch controller 27. Touch controller 27 is electrically connected to touch sensor 22. Touch controller 27 outputs input information from touch sensor 22 as a signal.

Spacer 23 is a substantially rectangular and board-shaped resin component for supporting touch sensor 22 and conductive plate 24 at a fixed interval. Conductive plate 24 is a substantially rectangular metal component. A central portion of conductive plate 24 includes recess 24a that is indented toward the rear side. Actuator 25 is a piezoelectric body that causes movable section 2 including touch sensor 22 to vibrate horizontally due to actuator 25 vibrating horizontally in the lateral direction (predetermined direction). Actuator 25 is substantially cuboid.

Support 26 is a resin component that supports decorative component 20, touch sensor 22, spacer 23, conductive plate 24, and actuator 25. Support 26 includes substantially rectangular and plate-shaped plate 26a, housing recess 26b that is indented from a central portion along the vertical direction of plate 26a toward the rear side, and two lateral walls 26c of housing recess 26b in plate 26a that extend from both ends of the lateral direction toward the rear side and face each other in the lateral direction. A central portion of plate 26a includes recess 26d that is indented toward the rear side so as to correspond to recess 24a of conductive plate 24. A base of this recess 26d includes housing recess 26b. Outer edges of plate 26a include receiver 26e that extends outwardly. This receiver 26e receives peripheral wall 20b of decorative component 20.

Touch sensor 22, spacer 23, and conductive plate 24 are laminated on a front surface of plate 26a in this order from the front side to the rear side. Plate 26a is fit into peripheral wall 20b of decorative component 20 along with touch sensor 22, spacer 23, and conductive plate 24 in this laminated state. Outer edges of touch sensor 22 are received by step 20c of decorative component 20. Peripheral wail 20b of decorative component 20 is fixed to plate 26a.

Housing recess 26b has an opening on the side of the front surface of plate 26a (base of recess 26d). The opening of housing recess 26b is substantially rectangular. Actuator 25 is fit into housing recess 26b. As mentioned above, touch sensor 22 is fixed to plate 26a of support 26, and actuator 25 is mechanically fixed to touch sensor 22 due to actuator 25 being fixed in housing recess 26b of support 26.

The opening of housing recess 26b is covered by a base of recess 24a of conductive plate 24. The base of housing recess 26b is disposed to form a gap between the base of housing recess 26b and support 3 in the perpendicular direction. A central portion of the base of housing recess 26b includes a columnar press 26f that extends toward the rear side. This press 26f presses pressure sensor 5 via damper 4.

Support 3 is a resin component that supports movable section 2 via four elastic components 8. Support 3 is substantially cuboid. Two lateral surfaces of support 3 facing each other in the lateral direction are substantially flush with outer surfaces of the two lateral walls 26c of support 26. Both vertical ends of each of the two lateral surfaces of support 3 that face each other in the lateral direction, include fitting 30 to which elastic component 8 is attached. Each of four lateral surfaces of support 3 include guide 31 that extends in the perpendicular direction. A portion in support 3 corresponding to press 26f of movable section 2 includes through-hole 32 through which press 26f passes. This through-hole 32 is disposed to form a gap between through-hole 32 and press 26f.

Elastic component 8 is a substantially rectangular and flat board-shaped copper flat spring (hereinafter, also called flat spring 8). This flat spring 8 is disposed to extend in the perpendicular direction across an outer surface of both lateral ends of a corresponding one of lateral walls 26c in support 26, and fitting 30 in support 3. Concretely, both longitudinal ends of flat spring 8 include fitting hole 80, and flat spring 8 is fixed to support 26 and support 3 with fastener 81 that passes through this fitting hole 80.

Damper 4 is a rubber component that absorbs the horizontal vibration of movable section 2 and support 3. Damper 4 is interposed between press 26f of movable section 2 and pressure sensor 5. Damper 4 includes disc 40, and flange 41 that extends radially outwardly from an end of this disc 40 on the rear side.

Pressure sensor 5 is a capacitance sensor that detects the pressing operation to touch sensor 22 by detecting an operation load applied to touch sensor 22. Only one pressure sensor 5 is disposed on a front surface of a central portion of middle plate 60, which will be described later, in main body 6 while being covered by damper 4. In other words, pressure sensor 5 is disposed on a side opposite to a side on which support 3 supports movable section 2. A detection direction of pressure sensor 5 (pressing operation direction of touch sensor 22) is the perpendicular direction. In other words, the detection direction of pressure sensor 5 is orthogonal to a vibration direction (lateral direction) of actuator 25. Pressure sensor 5 outputs detection information as a signal.

Main body 6 is a resin component that supports support 3. Main body 6 includes the substantially rectangular and plate-shaped middle plate 60; front side peripheral wall 61 that extends from outer edges of this middle plate 60 toward the front side, and is substantially rectangular when seen along the perpendicular direction; and rear side peripheral wall 62 that extends from the outer edges of middle plate 60 toward the rear side, and is substantially rectangular when seen along the perpendicular direction.

A central portion of conductive plate 60 includes protrusion 60a that protrudes toward the rear side. Front side peripheral wall 61 is disposed at an inner side of rear side peripheral wall 62 when seen along the perpendicular direction. Front side peripheral wall 61 is disposed to form a gap in the perpendicular direction between front side peripheral wall 61 and plate 26a of support 26 during normal operation. Support 3 is fit into front side peripheral wall 61. Concretely, a portion of an inner periphery of front side peripheral wall 61 corresponding to each guide 31 of support 3 includes guide receiver 61a that extends in the perpendicular direction. This guide receiver 61a engages with and supports guide 31 as to be movable in the perpendicular direction This enables support 3 to move in the perpendicular direction with respect to main body 6. Main body 6 and support 3 are coupled with snap-fits 63 and 33 for preventing support 3 to detach from main body 6.

Printed-circuit board (PCB) 9 is disposed in rear side peripheral wall 62. This PCB 9 is substantially rectangular. PCB 9 is interposed between protrusion 60a of main body 6 and protrusion 72, which will be described later, of back cover 7. PCB 9 includes controller 90. Touch sensor 22 is electrically connected to controller 90 via touch controller 27. Actuator 25 and pressure sensor 5 are electrically connected to controller 90. Controller 90 controls actuator 25 based on an input signal from touch sensor 22 and pressure sensor 5. Concretely, controller 90 drives actuator 25 to vibrate horizontally in the lateral direction when touch sensor 22 detects that the hand or finger of the user has contacted touch sensor 22, and a pressing operation force detected by pressure sensor 5 has at least a predetermined value.

Back cover 7 is a resin component that covers an opening on the rear side of main body 6. Back cover 7 includes a substantially rectangular and plate-shaped plate 70; and peripheral wall 71 that extends from outer edges of this plate 70 toward the front side, and is substantially rectangular seen along the perpendicular direction. A central portion of plate 70 includes protrusion 72 that protrudes toward the front side. Back cover 7 is fit into rear side peripheral wall 62 of main body 6.

Figure 4:
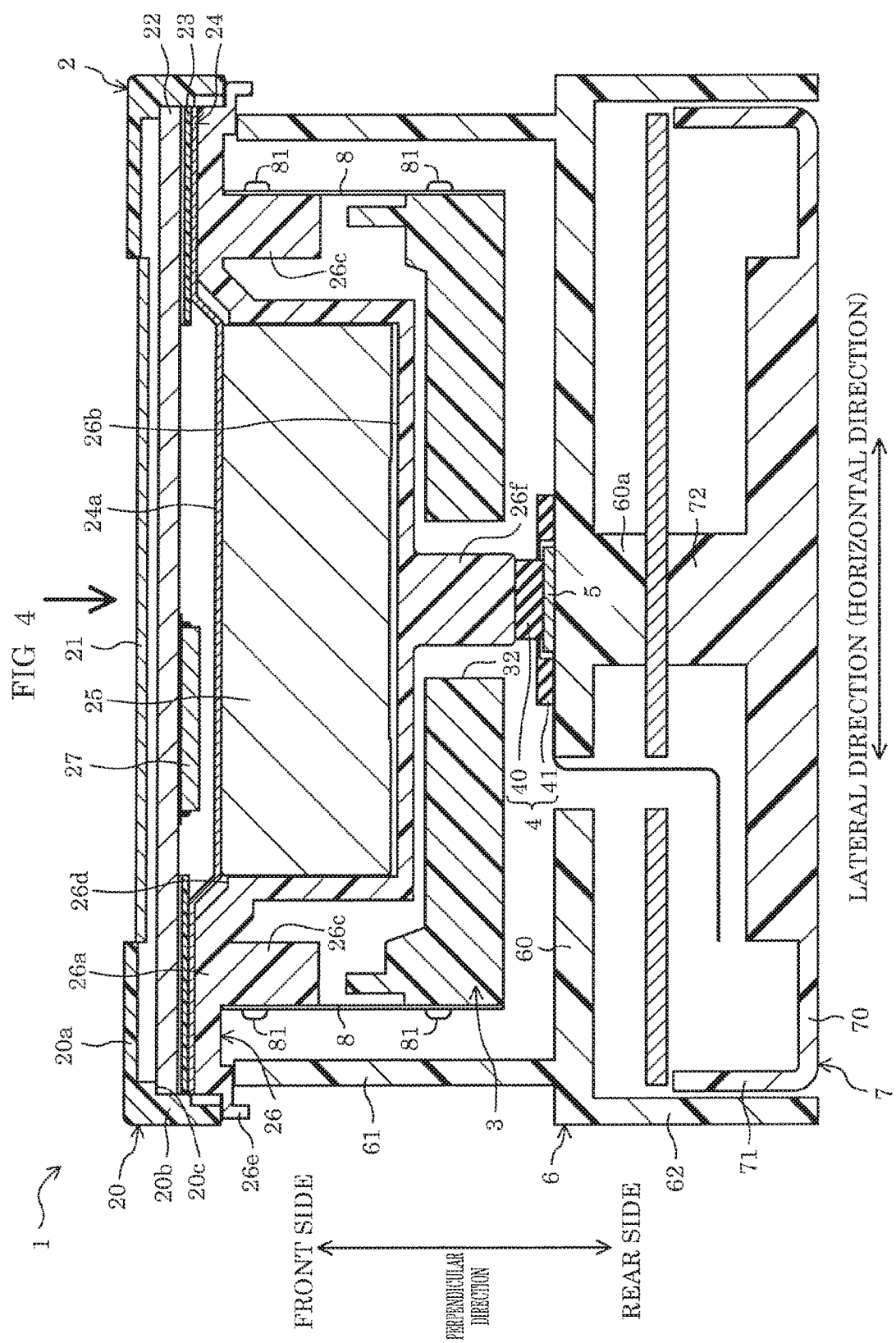
FIG. 4 is a diagram corresponding to FIG. 2 during a pressing operation to a touch sensor.

In input device 1 as configured above, as illustrated in FIG. 4, press 26f of movable section 2 transmits a force from the pressing operation (hereinafter referred to as pressing operation force) to pressure sensor 5 via damper 4 due to movable section 2 and support 3 moving integrally and as a whole in a direction of the pressing operation (hereinafter referred to as pressing operation direction) with respect to main body 6 when the pressing operation is performed. At this point, plate 26a of support 26 and front side peripheral wall 61 of main body 6 abut each other.

Figure 5:
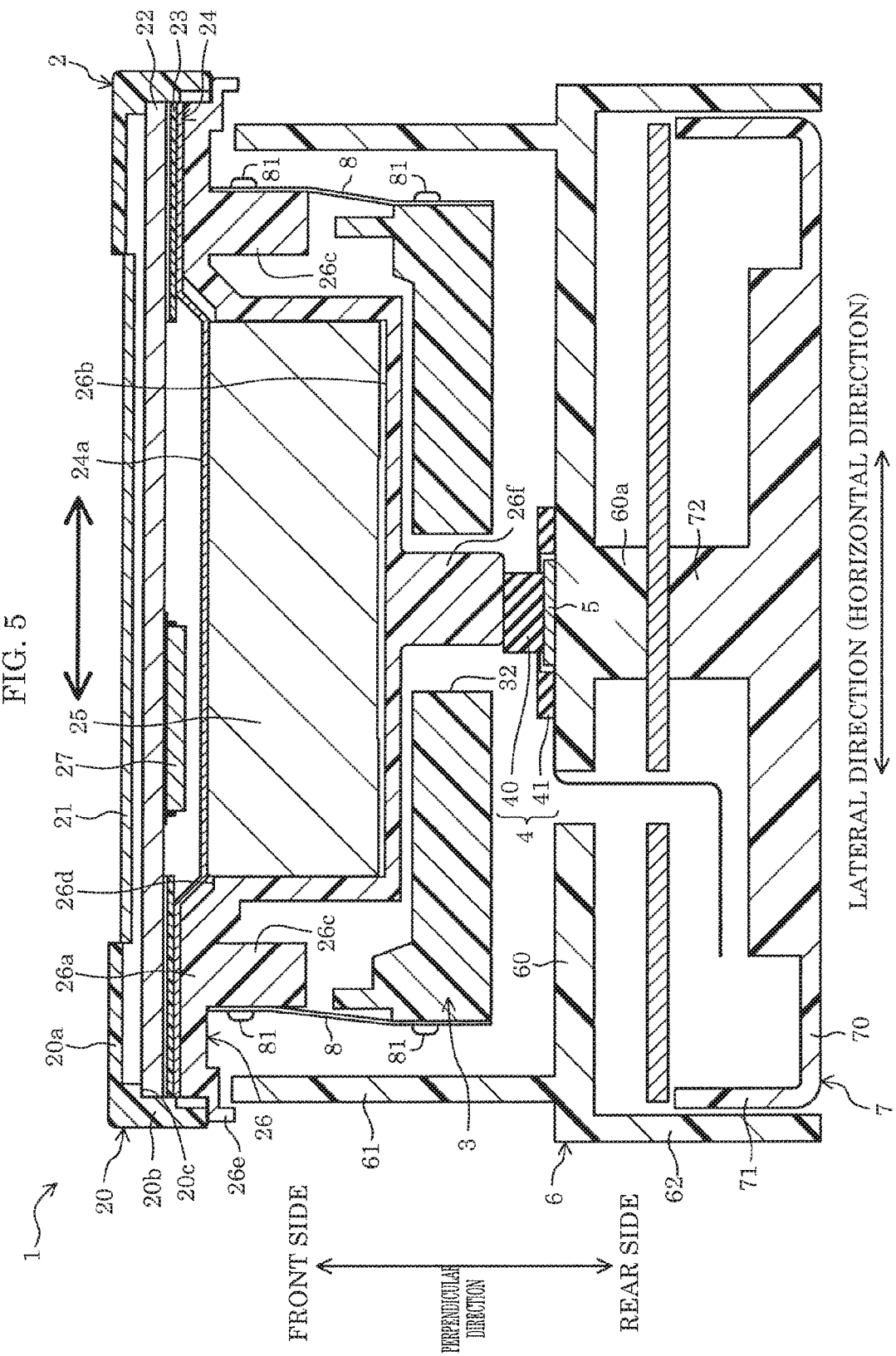
FIG. 5 is a diagram corresponding to FIG. 2 during lateral vibration of an actuator.

In input device 1, as illustrated in FIG. 5, movable section 2 including actuator 25 vibrates horizontally as a whole in the lateral direction with respect to support 3 due to flat spring 8 warping in the lateral direction when actuator 25 vibrates horizontally in the lateral direction.

Advantageous Effects

The present embodiment makes it possible to reduce pressure sensor 5 to 1, since press 26f of movable section 2 transmits the pressing operation force to pressure sensor 5 due to movable section 2 and support 3 moving integrally and as a whole in the pressing operation direction with respect to main body 6 when the pressing operation is performed to touch sensor 22.

Since only one pressure sensor 5 is disposed in approximately the center of touch sensor 22 when seen along the perpendicular direction, and movable section 2 and support 3 integrally move in the perpendicular direction during the pressing operation, a repelling force of the single pressure sensor 5 is transmitted to the hand or finger of the user. Thus, the operation sensitivity during the pressing operation can be equalized regardless of the pressing operation position detected by touch sensor 22.

Since pressure sensor 5 is a capacitance sensor, the operation load applied to touch sensor 22 can be detected when needed.

Since the vibration direction of actuator 25 is orthogonal to the detection direction of pressure sensor 5, it is possible to limit the pressing operation to touch sensor 22 and the vibration of actuator 25 to influence each other, and to also limit incorrect operation of touch sensor 22 in cases different from when the vibration direction of actuator 25 and the detection direction of pressure sensor 5 coincide.

Since elastic components 8 are flat springs each disposed across an outer surface of a corresponding one of two lateral walls 26c in movable section 2 that face each other in the lateral direction and a corresponding one of two lateral surfaces in support 3 that face each other in the lateral direction, the configuration of elastic components 8 can be simplified.

Since damper 4 is interposed between press 26f of movable section 2 and pressure sensor 5, it is possible to limit the vibration of movable section 2 including actuator 25 to occur at resonance points.

Damper 4 can easily be configured due to including rubber.

Since conductive plate 24 is interposed between touch sensor 22 and actuator 25, it is possible to reduce electric field noise from actuator 25 to touch sensor 22.

Embodiment 2

Embodiment 2 differs from Embodiment 1 in that the present Embodiment includes a component that transmits a pressing operation force to pressure sensor 5, but all other items are similar to Embodiment 1. Accordingly, overlapping description of components similar to components in Embodiment 1 may be omitted.

Figure 6:
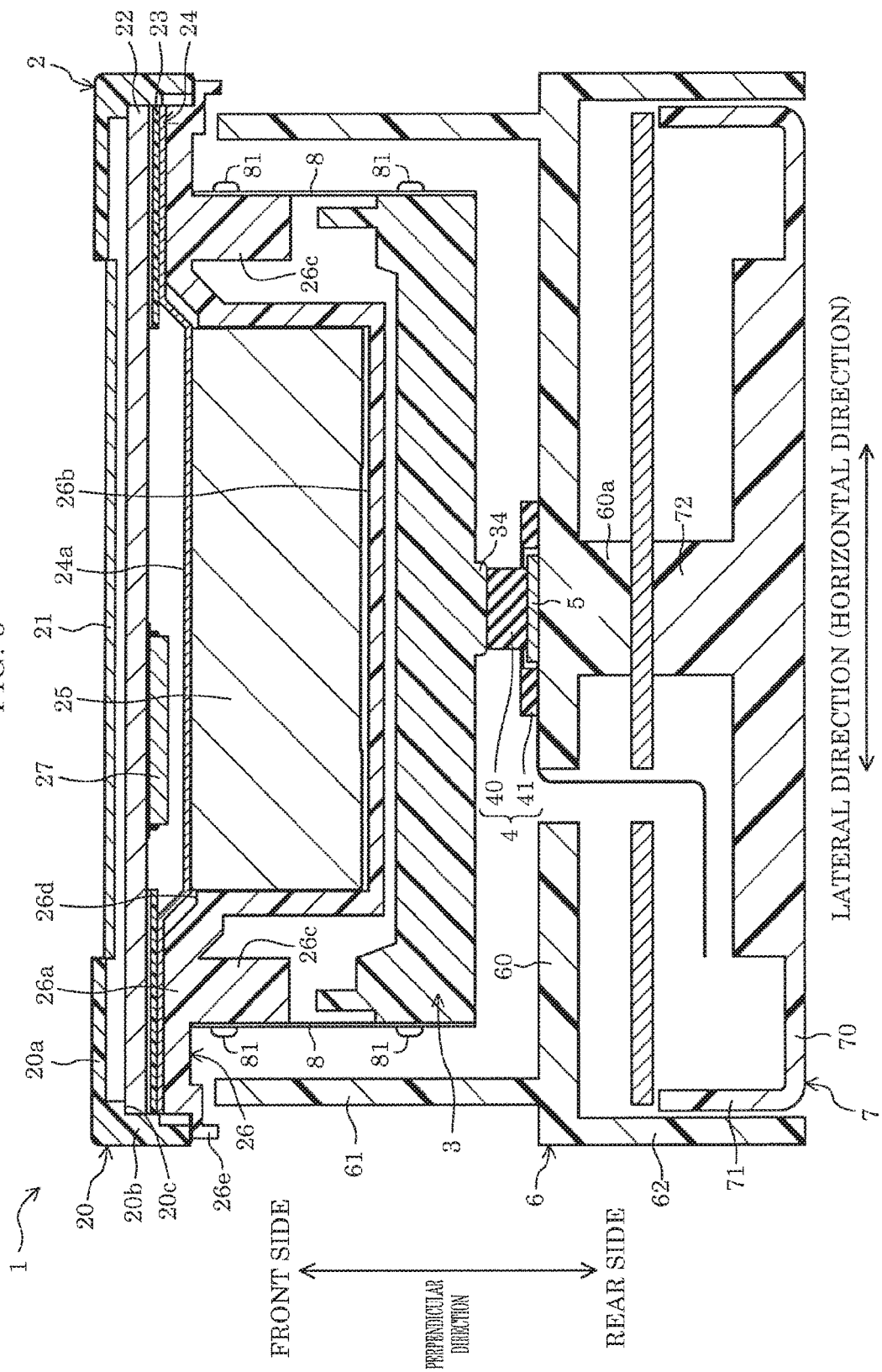
FIG. 6 is a diagram corresponding to FIG. 2 showing the input device according to Embodiment 2.

FIG. 6 is a diagram corresponding to FIG. 2 showing input device 1 according to the present embodiment. Different from Embodiment 1, movable section 2 does not include press 26f as illustrated in FIG. 6. Different from Embodiment 1, support 3 does not include through-hole 32. A disc-shaped press 34 that protrudes toward the rear side is disposed on a central portion on a rear surface of support 3. This press 34 presses pressure sensor 5 via damper 4.

In input device 1 as configured above, press 34 of support 3 transmits the pressing operation force to pressure sensor 5 via damper 4 due to movable section 2 and support 3 moving integrally and as a whole in the pressing operation direction with respect to main body 6 when the pressing operation is performed to touch sensor 22.

With present embodiment, the same advantageous effects as Embodiment 1 can be obtained.

Other Embodiments

The above embodiments include movable section 2 or support 3 that transmits a pressing operation force to pressure sensor 5, but may also include both movable section 2 and support 3.

In the above embodiments, pressure sensor 5 is a capacitance sensor, but may also be an optical sensor, piezoelectric sensor, or conductive rubber sensor. In this case, too, can the operation load applied to touch sensor 22 be detected when needed.

In the above embodiments, pressure sensor 5 is a capacitance sensor, but may also be a press switch. This makes it possible to manufacture pressure sensor 5 cheaper. When pressure sensor 5 is a press switch, pressure sensor 5 may include a metal dome. This enables pressure sensor 5 to obtain an operational feeling.

In the above embodiments, touch sensor 22 is a capacitive touch sensor, but may also be an optical or resistive sensor.

Figure 7:
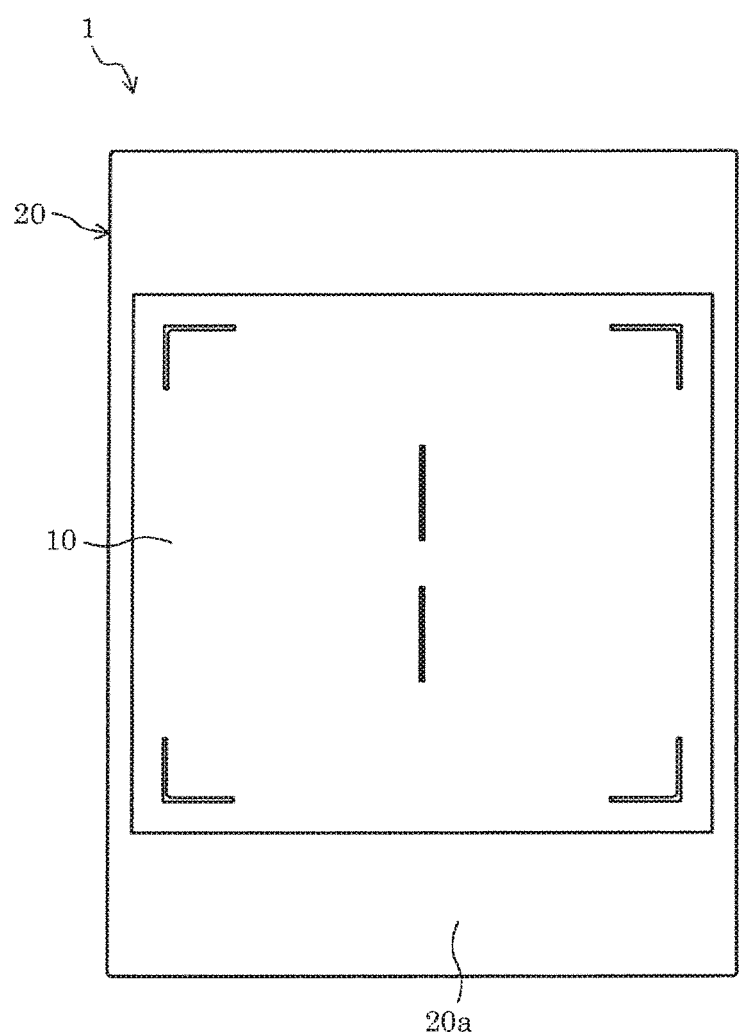
FIG. 7 is a plan view of the input device according to another embodiment.

In the above embodiments, as illustrated in FIG. 7, display 10 may be disposed on an operation surface (front surface) of touch sensor 22. In the example of FIG. 7, display 10 includes a screen. Display 10 may also be disposed on a side opposite of the operation surface of touch sensor 22 (rear surface).

In the above embodiments, actuator 25 is a piezoelectric body, but may also be electromagnetic component, such as a motor or a solenoid.

Figure 8:
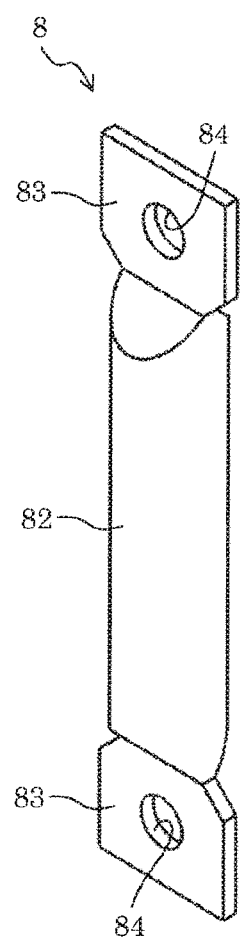
FIG. 8 is a perspective view of an elastic component according to the other embodiment.

In the above embodiments, a flat spring that is elastic component 8 may include a columnar portion disposed so that the axial direction thereof and the pressing operation direction coincide. Concretely, as illustrated in FIG. 8, the columnar elastic component 8 is a flat spring including column 82, and a plate-shaped fitting 83 disposed on both axial ends of this column 82. Column 82 may, for example, be copper or stainless steel wire cut appropriately to have a diameter that makes it possible to support movable section 2. Fitting 83 may be formed by cutting both axial ends of column 82, which is made of steel wire, and may also be press forged. Fitting 83 includes fitting holes 84. The columnar elastic component 8 is fixed to support 26 of movable section 2 and support 3 with fasteners (not illustrated) that pass through these fitting holes 84. When the flat spring that is elastic component 8 includes column 82 as a portion thereof, actuator 25 can be made into a component that vibrates horizontally in at least two directions. Thus, it is possible to further limit the occurrence of buckling than when elastic components 8 are flat springs. Elastic components 8 may also include multiple cylindrical components disposed so that the axial directions thereof and the pressing operation direction coincide. This makes it possible to obtain the same advantageous effects as when elastic components 8 are columnar.

In the above embodiments, damper 4 is disposed between at least one of moveable section 2 and support 3 that transmits a pressing operation force to pressure sensor 5 and pressure sensor 5, but the placement position of damper 4 is not limited thereto, and may, for example, also be between support 3 and main body 6. In this case, however, it is necessary to dispose multiple dampers 4 in symmetrical positions with pressure sensor 5 as the center, complicating the configuration of input device 1. Thus, in order to simplify the structure of input device 1, damper 4 may be disposed between the at least one of moveable section 2 and support 3 that transmits a pressing operation force to pressure sensor 5 and pressure sensor 5.

The components in the above embodiments may be optionally combined provided they are within the scope of the essence of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by references on their entirety: PCT International Application No. PCT/JP2018/1037228 filed on Oct. 4, 2018 and Japanese Patent Application No. 2017-241837 filed on Dec. 18, 2017.

INDUSTRIAL APPLICABILITY

As described above, the present disclosure can be used for an input device and the like.

What is claimed is:

1. An input device, comprising:
a movable section including a touch sensor, and an actuator that is fixed to the touch sensor and vibrates in a predetermined vibration direction;
a support that is connected to the movable section via an elastic component and supports the movable section, the elastic component including at least two flat springs;
a pressure sensor that (i) is disposed on a side opposite to a side on which the support supports the movable section and (ii) detects a pressing operation to the touch sensor; and
a main body that supports the support, wherein
each of the at least two flat springs is disposed across a corresponding one of two portions in the movable section that face each other in the predetermined vibration direction of the actuator and a corresponding one of two portions in the support that face each other in the vibration direction of the actuator,
the at least two flat springs extending in a direction parallel to a pressing operation direction and extending perpendicular to a touch surface of the touch sensor, the pressing operation direction being perpendicular to the predetermined vibration direction,
when the pressing operation is performed on the moveable section to apply pressure in the pressing operation direction, the movable section, the at least two flat springs, and the support integrally move together and as a whole in the pressing operation direction with respect to the main body, and
when the actuator vibrates in the predetermined vibration direction, the moveable section moves with respect to the support to cause warping of the at least two flat springs.

2. The input device according to claim 1, wherein the pressure sensor includes a capacitance sensor, an optical sensor, a piezoelectric sensor, or a conductive rubber sensor.

3. The input device according to claim 1, wherein the pressure sensor includes a press switch.

4. The input device according to claim 3, wherein the press switch includes a metal dome.

5. The input device according to claim 1, wherein the touch sensor is capacitive, optical, or resistive.

6. The input device according to claim 1, wherein a display is disposed on an operation surface of the touch sensor or a surface opposite to the operation surface.

7. The input device according to claim 6, wherein the display is a screen.

8. The input device according to claim 1, wherein the actuator is piezoelectric or electromagnetic.

9. The input device according to claim 1, wherein the predetermined vibration direction of the actuator differs from a detection direction of the pressure sensor.

10. The input device according to claim 1, wherein the at least two flat springs include a plurality of columnar or cylindrical components, and axial directions of the plurality of columnar or cylindrical components coincide with the pressing operation direction.

11. The input device according to claim 1, wherein
a damper is disposed between (i) the at least one of the movable section and the support that transmits the force from the pressing operation to the pressure sensor and (ii) the pressure sensor.

12. The input device according to claim 11, wherein
the damper includes rubber.

13. The input device according to claim 1, wherein
a conductive plate is disposed between the touch sensor and the actuator.

14. The input device according to claim 1, wherein
the at least two flat springs remain linear when the pressing operation is performed.

15. The input device according to claim 1, wherein
both longitudinal ends of each of the at least two flat springs include a fitting hole, and
each of the at least two flat springs is fixed to the movable section and provides support in the predetermined vibration direction with a fastener that passes through the fitting hole.

16. The input device according to claim 1, wherein
each of the at least two flat springs is formed in a shape of a rectangular flat plate, and a length of each of the at least two flat springs in the pressing operation direction is longer than a length in a direction orthogonal to both the pressing operation direction and the predetermined vibration direction.

\* \* \* \* \*